US 6,686,932 B2

(12) United States Patent
Rath et al.

(10) Patent No.: US 6,686,932 B2
(45) Date of Patent: Feb. 3, 2004

(54) SYSTEM AND METHOD FOR SHARING DATA ACROSS FRAMES USING ENVIRONMENT VARIABLES

(75) Inventors: Thomas William Rath, Owego, NY (US); Russell Thomas White, Jr., Conklin, NY (US)

(73) Assignee: International Business Machines Corporation, Armonk, NY (US)

(*) Notice: Subject to any disclaimer, the term of this patent is extended or adjusted under 35 U.S.C. 154(b) by 419 days.

(21) Appl. No.: 09/819,437

(22) Filed: Mar. 28, 2001

(65) Prior Publication Data

US 2003/0025727 A1 Feb. 6, 2003

(51) Int. Cl.[7] .......................... G06F 3/14; G06F 15/163
(52) U.S. Cl. ....................... 345/748; 345/740; 345/749; 345/760; 345/804; 709/203; 709/219; 709/329
(58) Field of Search .................. 345/748, 740, 345/749, 760, 804, 733, 808, 809, 738, 741, 744; 709/219, 203, 217, 313, 329, 311, 331; 715/513

(56) References Cited

U.S. PATENT DOCUMENTS

| 5,838,906 A | * | 11/1998 | Doyle et al. ............ 345/804 X |
| 6,032,150 A | * | 2/2000 | Nguyen .................. 715/513 X |
| 6,064,977 A | * | 5/2000 | Haverstock et al. .... 715/513 X |
| 6,356,283 B1 | * | 3/2002 | Guedalia .................... 345/760 |
| 2002/0107890 A1 | * | 8/2002 | Gao et al. ............... 709/203 X |
| 2002/0138658 A1 | * | 9/2002 | Sjostrom et al. ........ 709/203 X |

* cited by examiner

Primary Examiner—Raymond J. Bayerl
(74) Attorney, Agent, or Firm—Shelley M Beckstrand

(57) ABSTRACT

A system and method for sharing data from separate servers between browser frames. A first server opens a client browser frame set and loads data to a first frame. A second server is called from the first frame to open a window. Responsive to post command issued from the window, environment variables are passed from the second server to the first server and loaded data from the environment variables by the first server to a second frame of the frame set. Thereafter, data obtained from a second server, which is loaded in the second frame of the frame set, is available to the first frame.

17 Claims, 4 Drawing Sheets

Netscape

File  Edit  View  Go  Communicator  Help

Simulated OBI Order Form—Served from Hub3

Click on buttons to enter mock OBI order information in the form below and click on Submit.

The data will be sent to a Notes Agent on ereqsnd1 via a HTML From POST and notes will receive the data into its document context parameters. (agent called is SimulateOBI in recreate.nsf)

[Buy Item 1]  [Buy Item 2]  [Buy Item 3]

| Description | OBI Item 2; OBI Item 1; OBI Item 3 |
|---|---|
| Part Number | PN2; PN1; PN3 |
| Quantity | 2; 1; 3 |
| UOM | BG; PC; BX |
| Unit Price | 200; 100; 300 |
| Commodity Code | W20; W20; W20 |
| Currency Code | USD; USD; USD |
| OEM Part Number | OEMPN2; OEMPN1; OEMPN3 |
| Supplier Code | SC2; SC1; SC3 |
| Pkg Quantity | 20; 10; 30 |
| Lead Time | 2; 1; 3 |
| Number of Items | 3 |

[Submit]  [Reset]  [Cancel]

FIG. 4

SYSTEM AND METHOD FOR SHARING DATA ACROSS FRAMES USING ENVIRONMENT VARIABLES

CROSS REFERENCES TO RELATED APPLICATIONS

The following U.S. patent applications, filed concurrently or otherwise copending, are assigned to the assignee hereof and contain subject matter related, in certain respect, to the subject matter of the present application.

U.S. Ser. No. 09/657,215, filed Sep. 7, 2000, entitled "System and Method for Clustering Servers for Performance and Load Balancing";

U.S. Ser. No. 09/657,216, filed Sep. 7, 2000, entitled "System and Method for Front End Business Logic and Validation";

U.S. Ser. No. 09/657,217, filed Sep. 7, 2000, entitled "System and Method for Data Transfer With Respect to External Applications";

U.S. Ser. No. 09/656,037, filed Sep. 7, 2000, entitled "System and Method for Providing a Relational Database Backend";

U.S. Serial No. 09/656,803, filed Sep. 7, 2000, entitled "System and Method for Providing a Role Table GUI via Company Group";

U.S. Ser. No. 09/656,967, filed Sep. 7, 2000, entitled "System and Method for Populating HTML Forms Using Relational Database Agents";

U.S. Ser. No. 09/657,196, filed Sep. 7, 2000, entitled "System and Method for Catalog Administration Using Supplier Provided Flat Files"; and U.S. Ser. No. 09/657,195, filed Sep. 7, 2000, entitled "System and Method for Providing an Application Navigator Client Menu Side Bar";

U.S. Ser. No. 09/814,462, filed Mar. 28, 2001 entitled "SYSTEM AND METHOD FOR AUTOMATING INVOICE PROCESSING WITH POSITIVE CONFIRMATION".

U.S. Ser. No. 09/815, 318, filed Mar. 22, 2001, entitled "SYSTEM AND METHOD FOR GENERATING A COMPANY GROUP USER PROFILE".

U.S. Ser. No. 09/815,317, filed Mar. 22, 2001, entitled "SYSTEM AND METHOD FOR SYNCHRONIZING LEDGER ACCOUNTS BY COMPANY GROUP".

U.S. Ser. No. 09/815,320, filed Mar. 22, 2001, entitled "SYSTEM AND METHOD FOR GROUPING COMPANIES ACCORDING TO ACCOUNTING SYSTEM OR RULES".

U.S. Ser. No. 09/815,316, filed Mar. 22, 2001, entitled "SYSTEM AND METHOD FOR FRAME STORAGE OF EXECUTABLE CODE".

U.S. Ser. No. 09/815,313, filed Mar. 22, 2001, entitled "SYSTEM AND METHOD FOR INVOICE IMAGING THROUGH NEGATIVE CONFIRMATION PROCESS".

U.S. U.S. Ser. No. 09/815,312, filed Mar. 22, 2001, entitled "SYSTEM AND METHOD FOR LEVERAGING PROCUREMENT ACROSS COMPANIES AND COMPANY GROUPS".

U.S. Ser. No. 09/816,264, filed Mar. 23, 2001, entitled "SYSTEM AND METHOD FOR PROCESSING TAX CODES BY COMPANY GROUP".

U.S. Ser. No. 09/798,598, filed Mar. 2, 2001, entitled "SYSTEM AND METHOD FOR MANAGING INTERNET TRADING NETWORKS".

The above-identified patent applications are incorporated herein by reference.

BACKGROUND OF THE INVENTION

1. Technical field of the Invention

This invention pertains to client/server communications. More particularly, it relates to a common interface for transferring information in name/value pairs into a server agent.

2. Background Art

The Requisition and Catalog (Req/Cat Web) system described in the copending applications above referenced is a framed system in which it is required to share data provided by different servers between frames of a frameset established by a first server. A user accesses the server from a browser into which the first server opens a frameset including a plurality of frames. It is desired that the first server load data into at least one of the frames of the frame set, but that data in other frames of the frameset come from other servers, such as a-catalog.

However, because of browser built-in security features, for data to transfer between frames, it is required that the frames be loaded from the same server.

Thus, referring to FIG. 1, as is represented by interface 505, a first server 40 establishes a frameset including frames 443 and 445. As is represented by line 506, server 40 loads data into frame 443 that includes a selection button which, when selected, calls server 501 via interface 508 with a request to load frame 445 over interface 510 with further data. This may be done. However, if done, heretofore browser security did not allow sharing of information between frames 443 and 445, as is represented by line 511. This is because the data in frames 443 and 445 originated in separate servers 40, 501.

It is an object of the invention provide a system and method which allows sharing of data in separate frames from separate servers.

It is a further object of the invention to provide a system and method for transferring large amounts of data that can be shared between frames in a secure fashion between browser and a plurality of servers a web environment.

SUMMARY OF THE INVENTION

A system and method for sharing data from separate servers between browser frames, the method including the steps of operating a first server to open a client browser frame set and load data to a first frame; from the first frame, calling a second server to open a window; issuing a post command from the window; responsive to the post command, passing environment variables from the second server to the first server; and loading from the first server to a second frame of the frame set data from the environment variables.

In accordance with an aspect of the invention, there is provided a computer program product configured to be operable for sharing data from separate servers between browser frames.

Other features and advantages of this invention will become apparent from the following detailed description of the presently preferred embodiment of the invention, taken in conjunction with the accompanying drawings.

BRIEF DESCRIPTION OF THE DRAWINGS

FIG. 4 is a graphic illustration of a simulated OBI order form.

Best Mode for Carrying out the Invention

Figure 1:
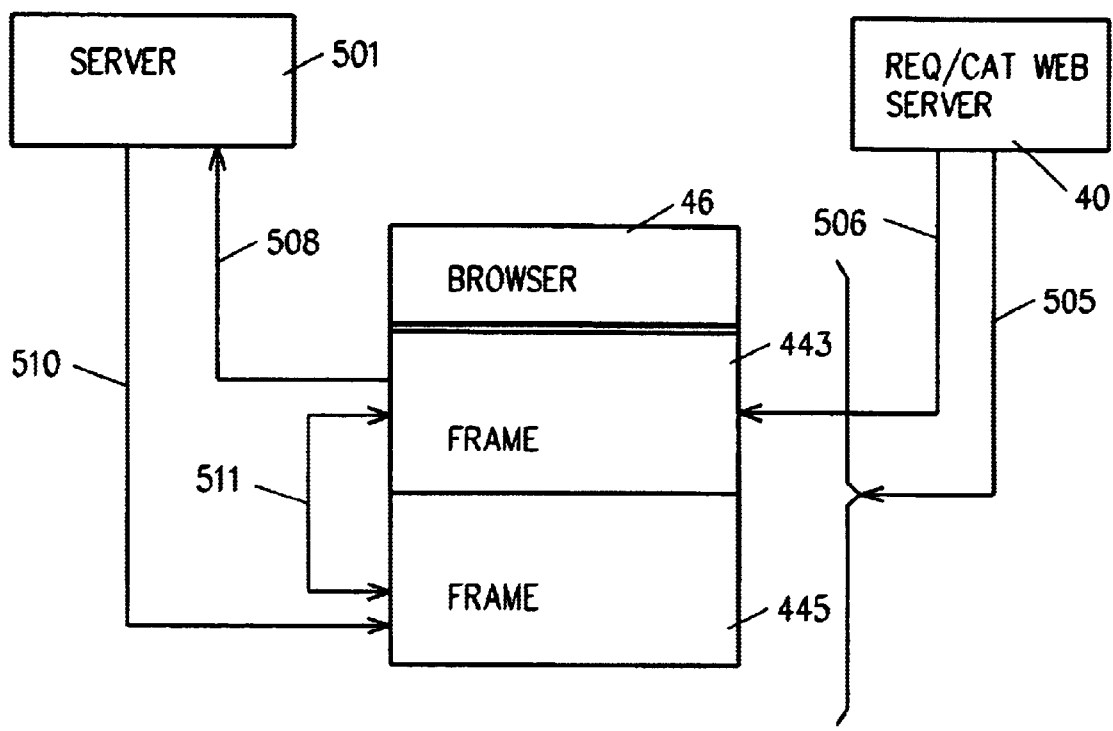
FIG. 1 illustrates a prior art system for loading data from different servers into different frames in a browser frameset.
Figure 2:
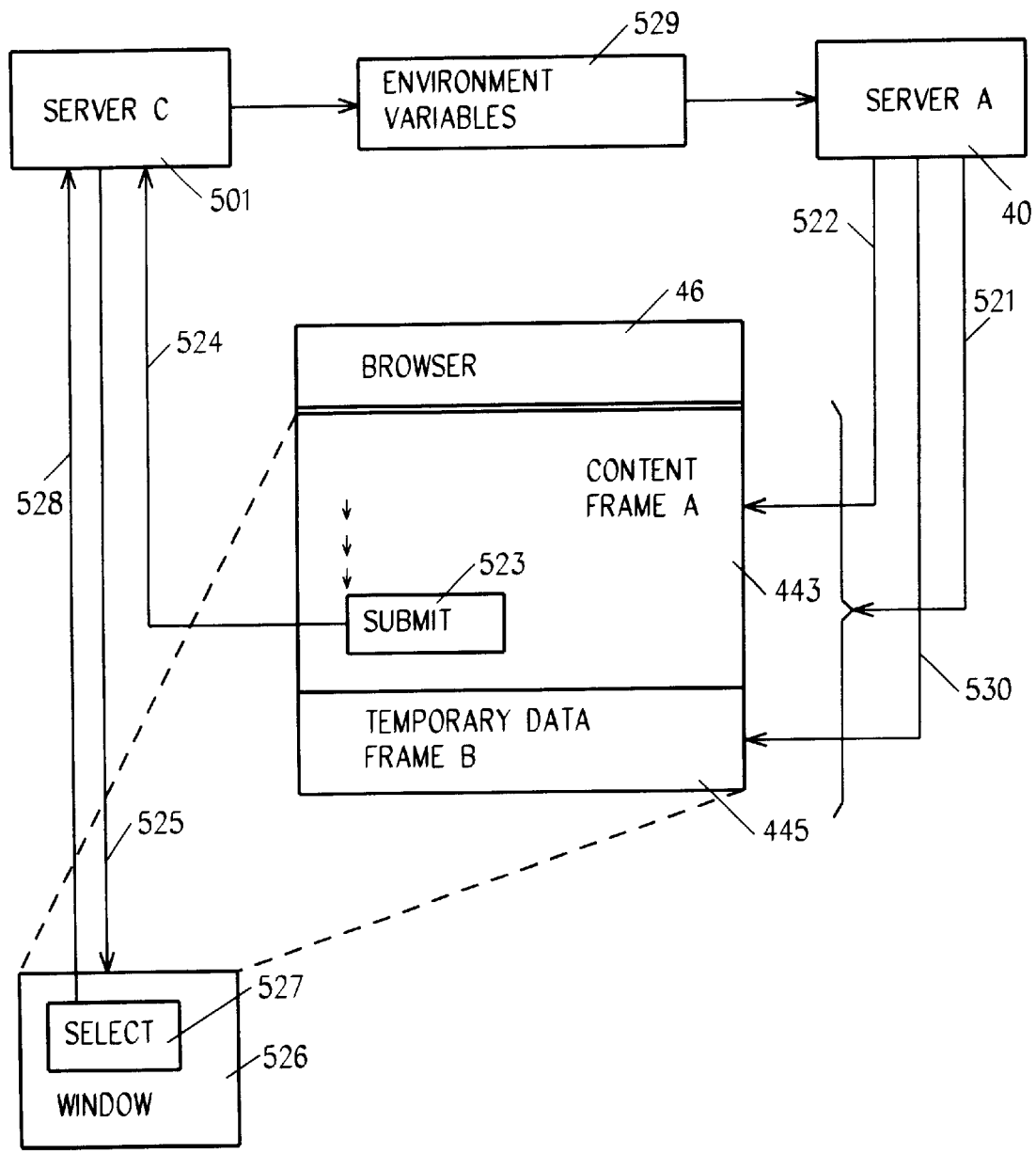
FIG. 2 illustrates a system flow for loading data from different servers into different frames in a browser frameset allowing sharing of data between frames in accordance with the preferred embodiment of the invention.

Referring to FIG. 2, a framed system environment in which the preferred embodiment of the invention exists includes server 40, server 501, and browser 46.

In operation, as is represented by line, or step, 521, a frameset comprising frames 443 and 445 are loaded to browser 46 by server 40. In step 522, frame 443 is filled from server 40, and frame 445 is intended to be filled with information obtained from an external server 501. However, as previously noted, if server 501 fills frame 445, then frames 443 and 445 cannot communicate because of browser built in security code.

In accordance with the preferred embodiment of the system and method of the invention, a way is provided to get the desired information into frame 445 by using a communications path that has server 501 call a cgi or Notes agent in server 40 with environment variables 529 including name/value pairs. That cgi or notes agent in server 40 is to parse the name value pairs in environment variables 529 and then fill frame 445.

Figure 3:
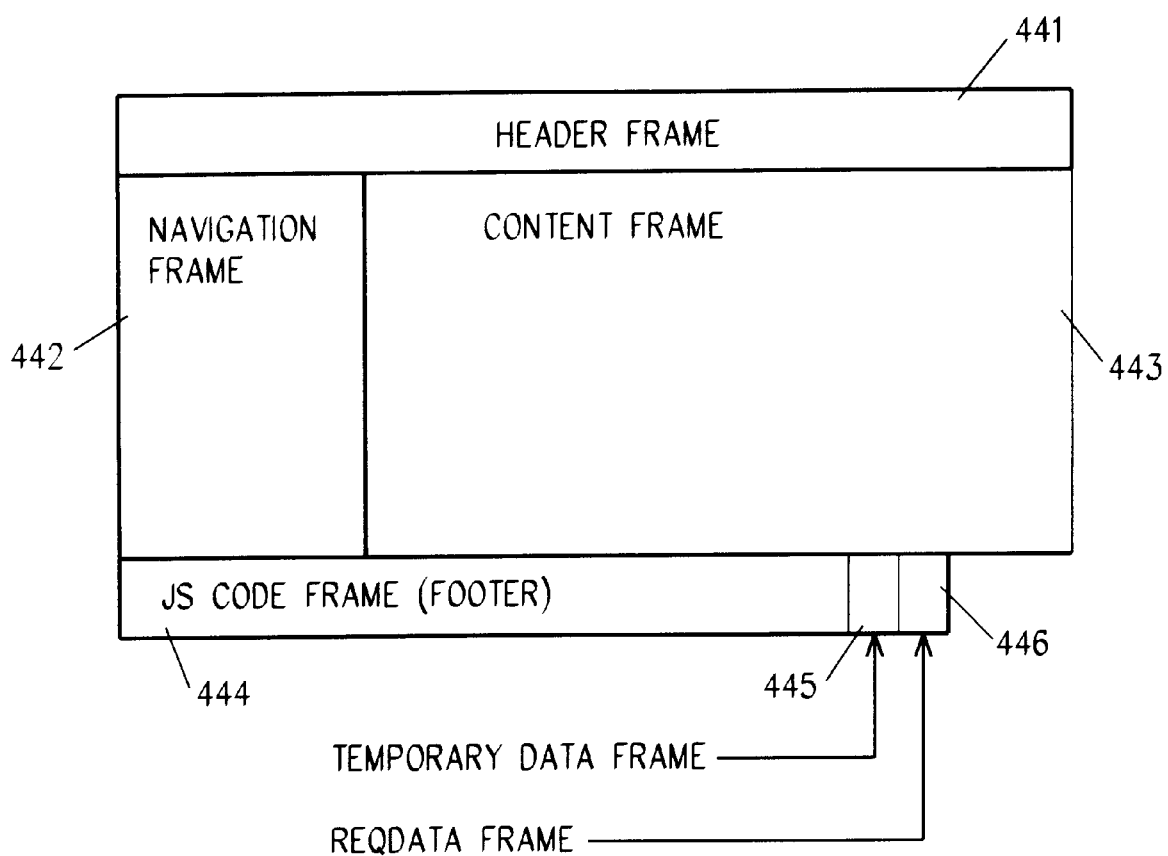
FIG. 3 is illustrates a frame set in accordance with the preferred embodiment of FIG. 2.

Referring to FIG. 3, a particular frame set includes header frame 441, navigation frame 442, content frame 443, footer frame 444, temporary data frame 445, and data accumulation (or, ReqData) frame 446. This is more fully described in copending application U.S. Ser. No. 09/815,316, filed Mar. 22, 2001, assignee docket number END9 2000 0174 US1.

This request from frame 443 could have come from a content 443, navigation 442, some other frame of the frame set.

Further in explanation of the operation of FIG. 2, at the conclusion of step 522, content (or data) frame 443 includes data loaded from server 40, but frame 445 does not have the data that it needs. The browser 46 user interacts with content frame 443 until satisfied, and then selects some action button, such as a submit 523 (for example, a request for a catalog). In step 524, server 501 responds to submit 523 by opening a window 526 in browser 46 containing, in this example, a catalog. The browser user interacts with window 526 to structure a request with respect to the catalog, and then clicks a select, or buy, button 527.

This "buy" is a post command 528, which is a request that is forwarded from server 501 to server 40 and contains, in this example, order information in the form of environment variables including name/value pairs field names and associated text value, such as description/text; price/text; delivery date/text; vendor/text; etc. Thus, this "buy" 527 or, in other situations, some other command button, executes the post command, and window 526 closes.

It would be desired to place these name/value pairs directly in temporary data frame 445, and this could be done, but if done, browser security would prevent the two frames 443 and 445 from sharing the information. For that to occur, frames 443 and 445 must be filled from the same server.

Thus, in accordance with the preferred embodiment of the invention, server 501 calls server 40, the server that created frame set 443, 445 and filled frame 443. A common gateway interface name/value pair capability of server 40 is used to receive the environment variables 529 from server 501. To accomplish this, server 501 executes a C program or a Notes agent on server 40. In doing so, names/value pairs 529 are accessible by server 40, and in step 530 server 40 can then fill frame 445 with the desired data which it received from server 501. Now, since both frames 443 and 445 are filled by the same server 40, browser security will allow them to communicate.

Two other very important advantages are achieved with this type of transferring of data. These are increased security of transfer from server 501 to frame 445, and increased quantities of information can be passed as part of the transfer from server 501 to frame 445.

Increased security is achieved when the data is transferred as environment variables 529 as distinguished from passing the data as part of an url.

Increased amounts of data can be transferred as environment variables 529 as distinguished from passing the data as part of an url.

An exemplary embodiment of the invention is described below.

Table 1 is a button 523 on frame 443 that is labeled "open simulated obi window". That button 523 when selected opens a window 526 and calls a program on server 501 to fill that window.

Table 2 is the code (OBImultiform.html), residing on a different server 501 called by the button in Table 1, and represents a three buttons simulated data entry form. In this example, OBImultiform.html is a flat html file used to simulate externally produced data, such as that which would be created by a server 501, and represents program code on the pop up window 526. This is the code which creates the window of FIG. 4, which is an example of a window 526. The three buttons Buy Item 1, Buy Item 2, Buy Item 3, can be selected in any order to simulate the purchase of any number of three different commodities. Selection of each button enters a preselected value followed by ";" in the data column for each row in the description column.

Table 2 calls Table 3, which is the agent on server 40 that passes data into frame 445. The data that is put in frame 445 is shown in FIG. 4.

Table 4 is the name/value pairs passed as environment variables 529 from server 501 to server 40.

Once the data is loaded to temporary data frame 445, it is accessible to content frame 443.

TABLE 1

Open Simulated OBI Window

```
function addOBIItemStub( ) {
var DS = parent.reqData.document._WebReq;
alert("Click to open Simulated OBI shopping window");
nexturl = "http://ServerC/OBImultiform.html";
valwind = window.open(nexturl, "ValidationWindow",
"HEIGHT=780, WIDTH=600,
scrollbars=yes, resizable=yes, status=yes");
}
```

TABLE 2

OBImultiform.html

```
OBImultiform.html
<html>
<head>
<script language="Javascript">
var itemCount=0;
function addItem1( ) {
    if (itemCount > 0) {
        addsemi( );
    }
    document.forms[0].Desc.value            += "OBI Item 1";
    document.forms[0].PartNum.value         += "PN1";
    document.forms[0].Quantity.value        += "1";
    document.forms[0].UOM.value             += "PC";
    document.forms[0].UPrice.value          += "100";
    document.forms[0].ComCode.value         += "W20";
    document.forms[0].CurrCode.value        += "USD";
    document.forms[0].OEMPartNum.value      += "OEMPN1";
    document.forms[0].SupplierCode.value    += "SC1";
    document.forms[0].PkgQuantity.value     += "10";
    document.forms[0].LeadTime.value        += "1";
    itemCount += 1;
    document.forms[0].itemCount.value = itemCount;
}
function addItem2( ) {
    if (itemCount > 0) {
        addsemi( );
    }
    document.forms[0].Desc.value            += "OBI Item 2";
    document.forms[0].PartNum.value         += "PN2";
    document.forms[0].Quantity.value        += "2";
    document.forms[0].UOM.value             += "BG";
    document.forms[0].UPrice.value          += "200";
    document.forms[0].ComCode.value         += "W20";
    document.forms[0].CurrCode.value        += "USD";
    document.forms[0].OEMPartNum.value      += "OEMPN2";
    document.forms[0].SupplierCode.value    += "SC2";
    document.forms[0].PkgQuantity.value     += "20";
    document.forms[0].LeadTime.value        += "2";
    itemCount += 1;
    document.forms[0].itemCount.value = itemCount;
}
function addItem3( ) {
    if (itemCount > 0) {
        addsemi( );
    }
    document.forms[0].Desc.value            += "OBI Item 3";
    document.forms[0].PartNum.value         += "PN3";
    document.forms[0].Quantity.value        += "3";
    document.forms[0].UOM.value             += "BX";
    document.forms[0].UPrice.value          += "300";
    document.forms[0].ComCode.value         += "W20";
    document.forms[0].CurrCode.value        += "USD";
    document.forms[0].OEMPartNum.value      += "OEMPN3";
    document.forms[0].SupplierCode.value    += "SC3";
    document.forms[0].PkgQuantity.value     += "30";
    document.forms[0].LeadTime.value        += "3";
    itemCount += 1;
    document.forms[0].itemCount.value = itemCount;
}
function addsemi1( ) {
    if (document.forms[0].Desc.value == " ") {
        itemCount = 0;
    } else {
        document.forms[0].Desc.value            += ";";
        document.forms[0].PartNum.value         += ";";
        document.forms[0].Quantity.value        += ";";
        document.forms[0].UOM.value             += ";";
        document.forms[0].UPrice.value          += ";";
        document.forms[0].ComCode.value         += ";";
        document.forms[0].CurrCode.value        += ";";
        document.forms[0].OEMPartNum.value      += ";";
        document.forms[0].SupplierCode.value    += ";";
        document.forms[0].PkgQuantity.value     += ";";
        document.forms[0].LeadTime.value        += ";";
    }
}
</script>
</head>
<body>
<form method=POST action="http://ServerA/rccreate.nsf/SimulateOBI? OpenAgent" target="tempData">
<center><font size=+1><b>Simulated OBI Order Form - Served from Hub3</b></font></center> <LINK REL= STYLESHEET TYPE='text/css" HREF="/reqcat/css/default_styles.css>
<hr>
<p class="prompt"> Click on buttons Buy Item 1, Buy Item 2, and Buy Item 3 to simulate an OBI order information on the form and click on Submit. The data will be sent to a Notes Agent on Server A via a HTML Form POST and Notes will receive the data into its document context parameters.
<hr>
<input type="button" name="add1" value=Buy Item 1 onClick="addItem1( );">
<input type="button" name="add1" value=Buy Item 2 onClick="addItem2( );">
<input type="button" name="add1" value=Buy Item 3 onClick="addItem3( );">
<hr>
<table border=1>
<tr><td class="field">Description </td><td><input type=text name="Desc" value= " "
size=40><td></tr>
<tr><td class="field">Part Number</td><td><input type=text name="PartNum" value= " "
size=40><td></tr>
<tr><td class="field">Quantity </td><td><input type=text name="Quantity" value= " "
size=40><td></tr>
<tr><td class="field">UOM </td><td><input type=text name="UOM" value= " "
size=40><td></tr>
<tr><td class="field">Unit Price </td><td><input type=text name="UPrice" value= " "
size=40><td></tr>
<tr><td class="field">Commodity Code </td><td><input type=text name="CommCode" value= " "
size=40><td></tr>
<tr><td class="field">Currency Code</td><td><input type=text name="CurrCode" value= " "
size=40><td></tr>
<tr><td class="field">OEM Part Number </td><td><input type=text name="OEMPartNum" value= " "
size=40><td></tr>
<tr><td class="field">Supplier Code </td><td><input type=text name="SupplierCode" value= " "
size=40><td></tr>
<tr><td class="field">Pkg Quantity </td><td><input type=text name="PkgQuantity" value= " "
size=40><td></tr>
<tr><td class="field">Lead Time </td><td><input type=text name="LeadTime" value= " "
size=40><td></tr>
<tr><td class="field">Number of Items </td><td><input type=text name="ItemkCount" value= "0"
size=10><td><tr><</tr>
</table>
<input type="submit" name="submitButton" value="Submit">
<input type="reset" name="resetButton" value="Reset">
<input type="button" name="cancelButton" value="Cancel"
onClick="Javascript:window.close( )">
</form>
</body>
</html>
```

TABLE 3

Simulate OBI Agent

```
Sub Initialize
    Dim s As New NotesSession
    Dim d As NotesDocument
```

TABLE 3-continued

Simulate OBI Agent

```
    set d=s.DocumentContext
    Print "<br>This agent received data from the HTML form."
    Print "<br>The data contained " & Cstr
(d.Content_Length(0)) & "characters."
    Print "<br> The data was encoded as " &
Cstr(d.Content_Type(0))
    Print "<br> The value of the data was:<br>" &
d.Request_Content(0) & "<br>" & Chr$ (13)
    Print "Now in AddNonCatItem agent"
    Print "<script>"
    Print "alert('Press OK to send this order to req')"
    Print|JavaScript:parent.jsCode.addItemsOBI
("|+d.Request_Content(0)+|","OBI")|
    Print "parent.jsCode.valwind.close( )"
    Print "</script>"
End Sub
```

TABLE 4

ShowForm Page

The Parameters Passed from the Form are:
Parameter: 1 - Name=Value:w3ibmTest=true
Parameter: 2 - Name=Value:Desc=OBI Item2;OBI Item1;OBI Item3
Parameter: 3 - Name=Value:PartNum=PN2;PN1;PN3
Parameter: 4 - Name=Value:Quantity=2;1;3
Parameter: 5 - Name=Value:UOM=BG;PC;BX
Parameter: 6 - Name=Value:UPrice=200;100;300
Parameter: 7 - Name=Value:CommCode=W20;W20;W20
Parameter: 8 - Name=Value:CurrCode=USD;USD;USD
Parameter: 9 - Name=Value:OEMPartNum=OEMPN2;OEMPN1;OEMPN3
Parameter: 10 - Name=Value:SupplierCode=SC2;SC1;SC3
Parameter: 11 - Name=Value:PkgQuantity=20;10;30
Parameter: 12 - Name=Value:LeadTime=2;1;3
Parameter: 13 - Name=Value:ItemCount=3
Parameter: 14 - Name=Value:submitButton=Submit Advantages over the Prior Art It is an advantage of the invention that there is provided a system and method which allows sharing of data in separate frames from separate servers.

It is a further advantage of the invention that there is provided a system and method for transferring large amounts of data that can be shared between frames in a secure fashion between browser and a plurality of servers a web environment.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for sharing data from separate servers between frames, comprising:

operating a first server to open a client browser frame set and load data to a first frame;

from said first frame, calling a second server to open a window;

issuing a post command from said window;

responsive to said post command, passing environment variables from said second server to said first server; and loading data from said environment variables from said first server to a second frame of said frame set.

2. A method for sharing data between frames of a browser frameset, comprising the steps of:

loading from a first server into a browser a frameset including a plurality of frames;

loading first data from said first server into a first frame of said frame set;

responsive to user selection of a first selection device at said browser, issuing a first command to a second server;

said second server, responsive to said first command, opening a window in said browser;

responsive to user selection of a second selection device at said browser, issuing a second command to said second server;

said second server, responsive to said second command, communicating environment variables to said first server; and responsive to said environment variables, said first server loading second data into said second frame.

3. The method of claim 2, said first selection device being a button within said first frame.

4. The method of claim 2, said second selection device being a button within said window.

5. The method of claim 2, said second server further responsive to said second command for closing said window.

6. The method of claim 2, said second command being a post command.

7. The method of claim 2, said environment variables including name/value pairs.

8. The method of claim 2, further comprising the step of:

said second server executing a program at said first server which receives said environment variables.

9. The method of claim 2, further comprising the step of:

communicating said second data from said second frame to said first frame.

10. The method of claim 2, said frame set including a navigation frame, a content frame, footer frame, a temporary data frame, and an application frame.

11. System for sharing data between frames of a browser frameset, comprising:

a first server for opening a frame set on said browser and loading data into a first frame of said frame set;

a second server responsive to a command from said browser for opening a window on said browser and responsive to a post command from said window for executing a program in said second server to pass environment variables to said first server;

said first server further responsive to said environment variables for loading second data into said second frame.

12. The system of claim 11, further comprising a selection device within said first frame for issuing said command.

13. The system of claim 11, said program being a Notes agent.

14. The system of claim 11, said browser transferring data from said second frame to said first frame.

15. The system of claim 11, said frame set comprising a navigation frame, a header frame, a content frame, a footer frame, a temporary data frame, and an application frame.

16. The system of claim 15, said first frame being any of said navigation frame, footer frame, or content frame and said second frame being said temporary data frame.

17. A program storage device readable by a machine, tangibly embodying a program of instructions executable by a machine to perform method steps for sharing data from separate servers between frames, said method steps comprising:

operating a first server to establish a frame set and load data to a first frame;

from said first frame, calling a second server to open a window;

issuing a post command from said window;

responsive to said post command, passing environment variables from said second server to said first server; and loading data from said environment variables from said first server to a second frame of said frame set.

* * * * *